United States Patent
Shin et al.

(10) Patent No.: US 7,672,148 B2
(45) Date of Patent: Mar. 2, 2010

(54) CONTROLLER AND METHOD FOR FREQUENCY-VARYING CONTROL OF POWER CONVERTER

(75) Inventors: Kentarou Shin, Yokohama (JP); Yasuaki Hayami, Yokosuka (JP); Kraisorn Throngnumchai, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 425 days.

(21) Appl. No.: 11/789,728

(22) Filed: Apr. 25, 2007

(65) Prior Publication Data

US 2007/0252625 A1 Nov. 1, 2007

(30) Foreign Application Priority Data

Apr. 26, 2006 (JP) ............................. 2006-122069

(51) Int. Cl.
*H02M 7/5387* (2007.01)
(52) U.S. Cl. ........................................................ 363/98
(58) Field of Classification Search .................. 363/95, 363/97, 98
See application file for complete search history.

(56) References Cited

U.S. PATENT DOCUMENTS

| | | | |
|---|---|---|---|
| 4,587,605 A * | 5/1986 | Kouyama et al. ............. 363/41 |
| 4,691,269 A * | 9/1987 | Yamane et al. ................ 363/41 |
| 4,851,982 A | 7/1989 | Tanahashi | |
| 4,905,135 A * | 2/1990 | Unehara et al. ............... 363/98 |
| 5,068,777 A * | 11/1991 | Ito .............................. 363/97 |
| 5,155,675 A * | 10/1992 | Maruyama et al. ............ 363/98 |
| 5,422,557 A | 6/1995 | Lee et al. | |
| 5,467,262 A * | 11/1995 | Nakata et al. ................. 363/41 |
| 5,627,742 A * | 5/1997 | Nakata et al. ................. 363/98 |
| 7,042,741 B2 * | 5/2006 | Tanaka et al. ................. 363/41 |
| 7,102,903 B2 * | 9/2006 | Nakamura et al. ............ 363/98 |
| 7,282,682 B2 * | 10/2007 | Suenaga et al. ............. 219/715 |
| 7,542,312 B2 | 6/2009 | Meguro et al. | |
| 2006/0192520 A1 | 8/2006 | Yin et al. | |
| 2006/0221656 A1 | 10/2006 | Meguro et al. | |

FOREIGN PATENT DOCUMENTS

| | | |
|---|---|---|
| JP | 03-218270 | 9/1991 |
| JP | 07-099795 | 4/1995 |
| JP | 2002-095262 A | 3/2002 |
| JP | 2006-136138 | 5/2006 |

* cited by examiner

*Primary Examiner*—Jeffrey L Sterrett
(74) *Attorney, Agent, or Firm*—Young Basile

(57) ABSTRACT

A controller and method changing a frequency of a control (or carrier) signal in accordance with a waveform that periodically changes within a first frequency range from a frequency fc1 to a frequency fc2, where the frequency fc1 is smaller than the frequency fc2, and a second frequency range from a frequency fc3 to a frequency fc4, where the frequency fc3 is smaller than the frequency fc4. The frequencies fc1 and fc4 satisfy the inequalities $(n-1) \cdot fc4 \leq n \cdot fc2$ and $n \cdot fc3 \leq (n+1) \cdot fc1$ and/or satisfy an approximate expression $n \cdot fc4 \approx (n+1) \cdot fc1$ where n is an integer. The frequencies fc2 and fc3 satisfy the inequalities $n \cdot fc2 \leq fs - \Delta fs$ and $fs + \Delta fs \leq n \cdot fc3$ where $fs \pm \Delta fs$ represents a predetermined frequency band.

27 Claims, 6 Drawing Sheets

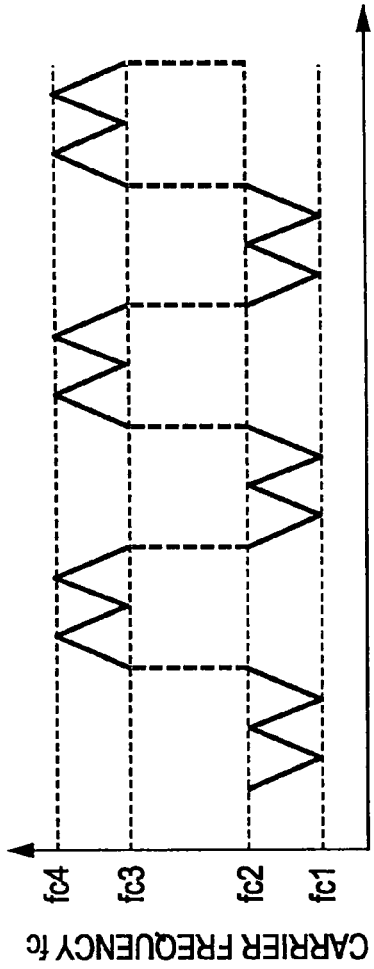
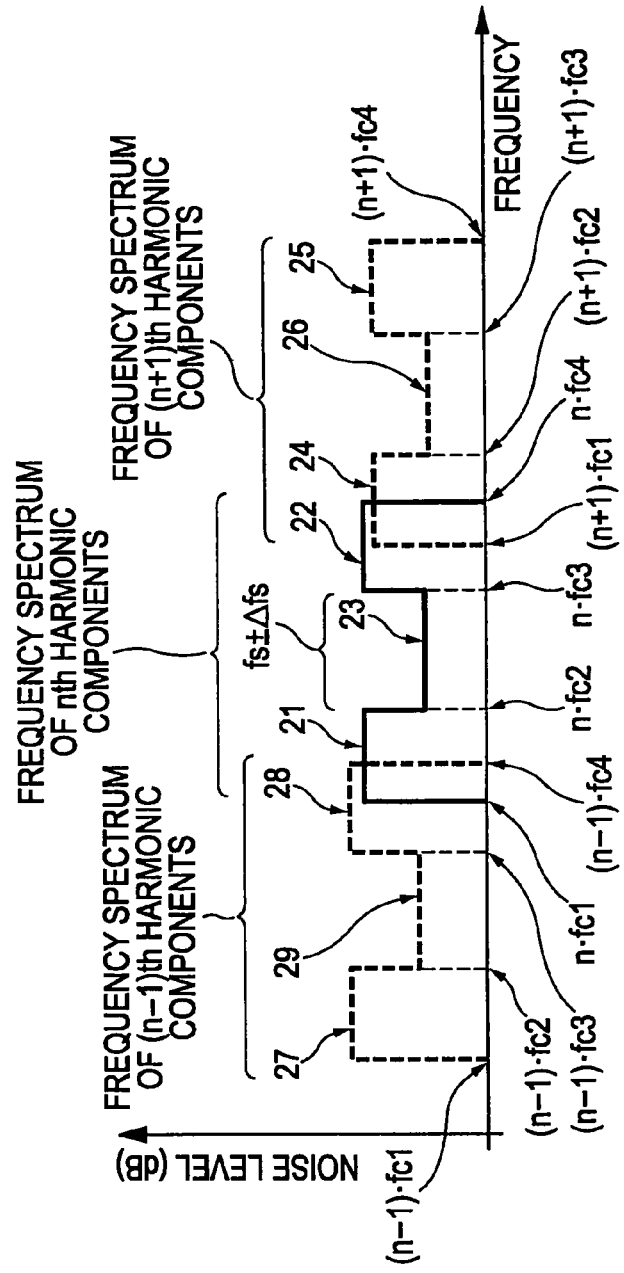
FIG. 2A
FIG. 2B

CONTROLLER AND METHOD FOR FREQUENCY-VARYING CONTROL OF POWER CONVERTER

CROSS-REFERENCE TO RELATED APPLICATIONS

This application claims priority from Japanese Patent Application Serial No. 2006-122069, filed on Apr. 26, 2006, which is incorporated herein in its entirety by reference.

FIELD OF THE INVENTION

The invention relates to controllers for power converters used for in-vehicle motors and to control methods for such power converters.

BACKGROUND

Stepping motor systems in which, in order to reduce electromagnetic interference (EMI) noise that is generated by controlling H-bridge field effect transistors (FETs), the frequency of a carrier signal (hereinafter referred to as a carrier frequency) used in pulse-width modulation (PWM) control is changed with time are known. In such systems, since the carrier frequency is changed sinusoidally with time, spectrum components having noise at high levels generated at an nth harmonic frequency of a predetermined carrier frequency are spread over an nth-order frequency range (for example, n·5 kHz to n·20 kHz) of a frequency range (for example, 5 kHz to 20 kHz) in which the carrier frequency is changed with time. Thus, the levels of the noise generated at the nth harmonic frequency can be reduced. Accordingly, interference with radio reception and other electronic apparatuses can be reduced. One example of such a system is shown in Japanese Unexamined Patent Application Publication No. 7-99795.

BRIEF SUMMARY

One embodiment of the invention provides a controller of a power converter that converts input electric power into a desired form and outputs the converted electric power by controlling a power converter switch. According to one example on a controller taught herein, the controller comprises a carrier signal generator operable to produce a carrier signal for controlling the power converter switch in accordance with a waveform that periodically changes within a first frequency range from a frequency $fc1$ to a frequency $fc2$, wherein the frequency $fc1$ is smaller than the frequency $fc2$, and within a second frequency range from a frequency $fc3$ to a frequency $fc4$, wherein the frequency $fc3$ is smaller than the frequency $fc4$. The controller in this example also includes a waveform generator operable to change a frequency of the waveform wherein the frequencies $fc1$ and $fc4$ satisfy at least one of: (A) an inequality $(n-1) \cdot fc4 \leq n \cdot fc2$ and an inequality $n \cdot fc3 \leq (n+1) \cdot fc1$ with respect to an integer n; and (B) an approximate expression $n \cdot fc4 \approx (n+1) \cdot fc1$ with respect to the integer n. The frequencies $fc2$ and $fc3$ also satisfy an inequality $n \cdot fc2 \leq fs - \Delta fs$ and an inequality $fs + \Delta fs \leq n \cdot fc3$ wherein $fs \pm \Delta fs$ represents a predetermined frequency band.

This invention further provides a controller of a power converter that converts input electric power into a desired form and outputs the converted electric power by controlling a built-in switch. The controller comprises a switching frequency changing system for temporally changing a frequency of a control signal for controlling the switch. The switching frequency changing system changes the frequency of the control signal in accordance with a waveform that periodically changes within a first frequency range from a first frequency $fc1$ to a second frequency $fc2$, where the first frequency $fc1$ is smaller than the second frequency $fc2$, and a second frequency range from a third frequency $fc3$ to a fourth frequency $fc4$, where the third frequency $fc3$ is smaller than the fourth frequency $fc4$. The first frequency $fc1$ and the fourth frequency $fc4$ are determined such that an approximate expression $n \cdot fc4 \approx (n+1) \cdot fc1$ is satisfied with respect to an integer n and the second frequency $fc2$ and the third frequency $fc3$ are determined such that an inequality $n \cdot fc2 \leq fs - \Delta fs$ and an inequality $fs + \Delta fs \leq n \cdot fc3$ are satisfied where a predetermined frequency band is represented by $fs \pm \Delta fs$.

This invention further provides a control method for a power converter that converts input electric power into a desired form and outputs the converted electric power by controlling a built-in switch. The control method comprises the steps of: changing the frequency of a control signal for controlling the switch in accordance with a waveform that periodically changes within a first frequency range from a first frequency $fc1$ to a second frequency $fc2$, where the first frequency $fc1$ is smaller than the second frequency $fc2$, and a second frequency range from a third frequency $fc3$ to a fourth frequency $fc4$, where the third frequency $fc3$ is smaller than the fourth frequency $fc4$; and determining, when a predetermined frequency band is represented by $fs \pm \Delta fs$, the first frequency $fc1$ and the fourth frequency $fc4$ such that an inequality $(n-1) \cdot fc4 \leq n \cdot fc2$ and an inequality $n \cdot fc3 \leq (n+1) \cdot fc1$ are satisfied with respect to an integer n and the second frequency $fc2$ and the third frequency $fc3$ are determined such that an inequality $fs + \Delta fs \leq n \cdot fc3$ are satisfied.

Another example of a controller taught herein comprises means for temporally changing a frequency of a control signal for controlling the power converter switch in accordance with a waveform that periodically changes within a first frequency range from a frequency $fc1$ to a frequency $fc2$, wherein the frequency $fc1$ is smaller than the frequency $fc2$, and within a second frequency range from a frequency $fc3$ to a frequency $fc4$, wherein the frequency $fc3$ is smaller than the frequency $fc4$, and means for determining the frequencies $fc1$ and $fc4$ such that, with respect to an integer n, at least one of: (A) an inequality $(n-1) \cdot fc4 \leq n \cdot fc2$ and an inequality $n \cdot fc3 \leq (n+1) \cdot fc1$ are satisfied, and (B) an approximate expression $n \cdot fc4 \approx (n+1) \cdot fc1$ is satisfied. The controller in this example also includes means for determining the frequencies $fc2$ and $fc3$ that satisfy an inequality $n \cdot fc2 \leq fs - \Delta fs$ and an inequality $fs + \Delta fs \leq n \cdot fc3$ wherein $fs \pm \Delta fs$ represents a predetermined frequency band.

Control methods for a power converter that converts input electric power into a desired form and outputs the converted electric power by controlling a power converter switch are also taught herein. One embodiment disclosed by example herein comprises changing a frequency of a control signal for controlling the power converter switch in accordance with a waveform that periodically changes within a first frequency range from a frequency $fc1$ to a frequency $fc2$, wherein the frequency $fc1$ is smaller than the frequency $fc2$, and within a second frequency range from a frequency $fc3$ to a frequency $fc4$, wherein the frequency $fc3$ is smaller than the frequency $fc4$. This method also includes determining the frequencies $fc1$ and $fc4$ such that at least one of: (A) an inequality $(n-1) \cdot fc4 \leq n \cdot fc2$ and an inequality $n \cdot fc3 \leq (n+1) \cdot fc1$ are satisfied with respect to an integer n, and (B) an approximate expression $n \cdot fc4 \approx (n+1) \cdot fc1$ is satisfied with respect to the integer n. Finally, the method in this example includes determining the frequencies $fc2$ and $fc3$ that satisfy an inequality $n \cdot fc2 \leq fs -$ $\Delta$fs and an inequality fs+$\Delta$fs$\leq$n·fc3 wherein fs$\pm\Delta$fs represents a predetermined frequency band.

BRIEF DESCRIPTION OF THE DRAWINGS

The description herein makes reference to the accompanying drawings wherein like reference numerals refer to like parts throughout the several views, and wherein:

FIG. 2A shows a temporal change of a carrier frequency in a first embodiment of the invention;

FIG. 2B shows harmonic spectra in the first embodiment;

DETAILED DESCRIPTION OF EMBODIMENTS OF THE INVENTION

In systems such as that discussed in Japanese Unexamined Patent Application Publication No. 7-99795, if the frequency range of the carrier frequency that is changed with time is further increased, the levels of the noise generated at the nth harmonic frequency can be further reduced since spectrum components having noise at high levels generated at the nth harmonic frequency of the predetermined carrier frequency are spread over the nth-order frequency range. However, if the nth-order frequency range is too wide, the spectrum in which the levels of noise generated at the nth harmonic frequency of the predetermined carrier frequency are spread over the nth-order frequency range and the spectrum in which the levels of noise generated at the (n+1)th harmonic frequency are spread over the (n+1)th-order frequency range overlap each other. Thus, the level of noise generated in a predetermined frequency range is increased.

Embodiments of the invention are capable of reducing the level of noise generated in a wide frequency range and of further reducing the level of noise generated in a predetermined frequency range. Embodiments can change a frequency of a control signal in accordance with a waveform that periodically changes within a first frequency range from a frequency fc1 to a frequency fc2, where the frequency fc1 is smaller than the frequency fc2, and a second frequency range from a frequency fc3 to a frequency fc4, where the frequency fc3 is smaller than the frequency fc4. They can also determine the frequencies fc1 and fc4 such that an inequality (n-1)·fc4$\leq$n·fc2 and an inequality n·fc3$\leq$(n+1)·fc1 are satisfied with respect to an integer n and the frequencies fc2 and fc3 that satisfy an inequality n·fc2$\leq$fs-$\Delta$fs and an inequality fs+$\Delta$fs$\leq$n·fc3 when a predetermined frequency band is represented by fs$\pm\Delta$fs. Accordingly, the level of noise generated in a wide frequency range can be reduced, and the level of noise generated in a predetermined frequency range can be further reduced.

An inverter system includes an inverter, which is an example of a power converter used in an embodiment of the invention, that supplies sinusoidal alternating current (AC) power by performing PWM modulation on an output of a direct current (DC) power source will be described. Inverter systems according to first to fifth embodiments of the invention are described with reference to FIGS. 1 to 6.

Configuration and operation of an inverter system 1 is now described with reference to FIG. 1.

Figure 1:
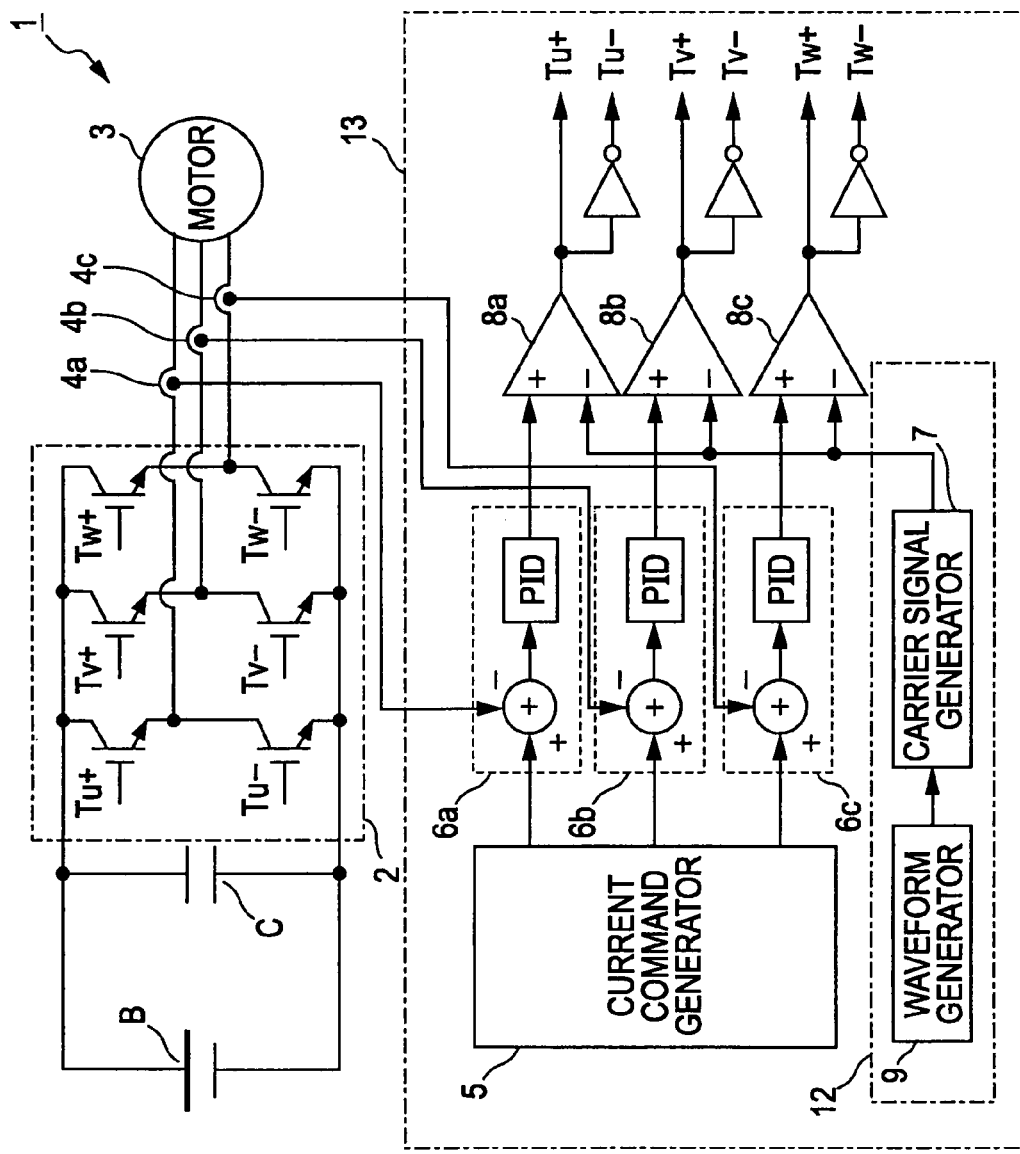
FIG. 1 shows a configuration of an inverter system.

Referring to FIG. 1, the inverter system 1 includes, as main component parts, a PWM inverter 2, a three-phase brushless motor (hereinafter, referred to as a motor) 3, current sensors 4a, 4b, and 4c, a controller 13, a battery B and a capacitor C. The controller 13 includes a current command generator 5, proportional-integral-differential (PID) controllers 6a, 6b and 6c, comparators 8a, 8b and 8c and a carrier frequency changing unit 12. Although the controller 13 is shown as a microcomputer including a central processing unit (CPU), input and output ports (I/O), random access memory (RAM), keep alive memory (KAM), a common data bus and read only memory (ROM) as an electronic storage medium for executable programs and certain stored values as discussed hereinafter. The functions performed by the elements of the controller 13 described herein could be implemented in software as executable programs, or could be implemented in whole or in part by separate hardware in the form of one or more integrated circuits (IC).

The PWM inverter 2 includes six switching elements Tu+, Tu−, Tv+, Tv−, Tw+ and Tw−. Each of the switching elements Tu+, Tu−, Tv+, Tv−, Tw+ and Tw− selects the positive terminal or the negative terminal of a current power source including the battery B and the capacitor C under the control of the corresponding one of the comparators 8a, 8b and 8c and connects the selected terminal to a terminal of one of the U phase, V phase, and W phase of the motor 3 corresponding thereto. Each of the switching elements Tu+, Tu−, Tv+, Tv−, Tw+ and Tw− is formed of a semiconductor element, such as an insulated gate bipolar transistor (IGBT).

The current sensors 4a, 4b and 4c detect a U-phase current, a V-phase current and a W-Phase current supplied from the PWM inverter 2 to the motor 3. The current command generator 5 generates sinusoidal current commands to convert the currents detected by the current sensors 4a, 4b and 4c into sinusoidal AC currents. The PID controllers 6a, 6b and 6c perform PID control on the currents detected by the current sensors 4a, 4b and 4c such that the currents detected by the current sensors 4a, 4b and 4c comply with the current commands generated by the current command generator 5.

The carrier frequency changing unit 12 includes a carrier signal generator 7 and a waveform generator 9. The waveform generator 9 generates a voltage waveform that is output for changing the frequency of a carrier signal (hereinafter, referred to as a carrier frequency). More specifically, the waveform generator 9 performs the functions of a first oscillator, a second oscillator and an adder. The first oscillator outputs a triangular wave having a predetermined frequency. The second oscillator outputs a square wave having a frequency that is smaller than the frequency of the triangular wave. An output of the first oscillator and an output of the second oscillator have the same cycle, and the waveform of the output of the first oscillator and the waveform of the output of the second oscillator are symmetrical to each other in each half cycle. The adder generates a voltage waveform obtained by adding the triangular wave and the square wave and outputs the generated voltage waveform to the carrier signal generator 7.

The carrier signal generator 7 generates a carrier signal using a voltage-controlled oscillator (VCO) and the like in accordance with the voltage waveform output from the waveform generator 9. The carrier signal is a triangular wave having a carrier frequency fc (see FIGS. 2A and 2B). The carrier signal generator 7 outputs the generated carrier signal to each of the comparators 8a, 8b and 8c.

The comparators 8a, 8b and 8c compare the carrier signal having a triangular waveform with output values of the PID controllers 6a, 6b and 6c, respectively. The comparators 8a, 8b and 8c input to the PWM inverter 2 signals for turning on or off the switching elements Tu+, Tu−, Tv+, Tv−, Tw+ and Tw− of the PWM inverter 2 in accordance with the comparison results. As an example of the control of the U-phase switching elements Tu+ and Tu−, an operation of the comparator 8a is described. If an output value of the PID controller 6a is greater than the carrier signal having a triangular waveform, the comparator 8a controls the switching element Tu+ to be turned on and the switching element Tu− to be turned off. Thus, a positive voltage is applied to the U phase of the motor 3. In contrast, if an output value of the PID controller 6a is smaller than the carrier signal having a triangular waveform, the comparator 8a controls the switching element Tu+ to be turned off and the switching element Tu− to be turned on. Thus, a negative voltage is applied to the U phase of the motor 3.

A change of a carrier frequency fc in a first embodiment of the invention is described next. FIG. 2A shows a temporal change of a carrier frequency fc in the first embodiment. FIG. 2B shows harmonic spectra in the first embodiment.

As shown in FIG. 2A, in a first frequency range from a frequency fc1 to a frequency fc2, where the frequency fc1 is smaller than the frequency fc2, and a second frequency range from a frequency fc3 to a frequency fc4, where the frequency fc3 is smaller than the frequency fc4, the carrier frequency fc changes in a triangular wave shape. In addition, in a third frequency range from the frequency fc2 to the frequency fc3, where the frequency fc2 is smaller than the frequency fc3, the carrier frequency fc shifts almost vertically. In the case where the carrier frequency fc changes with time as shown in FIG. 2A, two consecutive triangular wave components are observed in each of the first frequency range from the frequency fc1 to the frequency fc2 and the second frequency range from the frequency fc3 to the frequency fc4. In this case, the frequency spectrum of nth harmonic components (n is an integer) of the carrier frequency fc are obtained as shown in FIG. 2B.

Referring now to FIG. 2B, the frequency spectrum of the nth harmonic components exhibits first noise level 21, which is substantially flat, in an nth-order frequency range from n·fc1 to n·fc2 and second noise level 22, which is substantially flat, in an nth-order frequency range from n·fc3 to n·fc4. In addition, the frequency spectrum exhibits third noise level 23, which is lower than the first noise level 21 and the second noise level 22, in an nth-order frequency range from n·fc2 to n·fc3. Thus, EMI noise in a predetermined frequency range, that is, the nth-order frequency range from n·fc2 to n·fc3, can be further reduced.

Similarly, the frequency spectrum of (n+1)th harmonic components exhibits first noise level 24, which is substantially flat, in an (n+1)th-order frequency range from (n+1)·fc1 to (n+1)·fc2 and second noise level 25, which is substantially flat, in an (n+1)th-order frequency range from (n+1)·fc3 to (n+1)·fc4. In addition, the frequency spectrum exhibits third noise level 26, which is lower than the first noise level 24 and the second noise level 25, in an (n+1)th-order frequency range from (n+1)·fc2 to (n+1)·fc3. Similarly, the frequency spectrum of (n−1)th harmonic components exhibits first noise level 27, which is substantially flat, in an (n−1)th-order frequency range from (n−1)·fc1 to (n−1)·fc2 and second noise level 28, which is substantially flat, in an (n−1)th-order frequency range from (n−1)·fc3 to (n−1)·fc4. In addition, the frequency spectrum exhibits third noise level 29, which is lower than the first noise level 27 and the second noise level 28, in an (n−1)th-order frequency range from (n−1)·fc2 to (n−1)·fc3.

Thus, in this embodiment, "fc1", "fc2", "fc3" and "fc4" are set such that inequalities (1.1) and (1.2) are satisfied:

$$(n-1) \cdot fc4 \leq n \cdot fc2; \text{ and} \quad (1.1)$$

$$n \cdot fc3 \leq (n+1) \cdot fc1. \quad (1.2)$$

When inequalities (1.1) and (1.2) are satisfied, in the frequency spectrum of the nth harmonic components of the carrier frequency fc, the frequency range having the third noise level 23, that is, the nth-order frequency range from n·fc2 to n·fc3, does not overlap the frequency range having the second noise level 28 of the adjacent frequency spectrum of the (n−1)th harmonic components, that is, the (n−1)th order frequency range from (n−1)·fc3 to (n−1)·fc4. Similarly, in the frequency spectrum of the nth harmonic components of the carrier frequency fc, the frequency range having the third noise level 23, that is, the nth-order frequency range from n·fc2 to n·fc3, does not overlap the frequency range having the first noise level 24 of the adjacent frequency spectrum of the (n+1)th harmonic components, that is, the (n+1)th-order frequency range from (n+1)·fc1 to (n+1)·fc2. Thus, in the nth-order frequency range from n·fc2 to n·fc3 of the frequency spectrum of the nth harmonic components of the carrier frequency fc, an increase in the level of noise caused by overlapping of the first noise level 24 and the second noise level 28 with the third noise level 23 can be suppressed.

When "n", "fc2" and "fc3" are set such that, for example, a range of radio broadcasting waves, which is a broadcasting frequency band fs±Δfs, is included in the nth-order frequency range from n·fc2 to n·fc3 of the frequency spectrum of the nth harmonic components, a problem caused by EMI noise due to a carrier frequency fc generated by the operation of the inverter system 1 when a user listens to a broadcast received by a radio receiver located in the vicinity of the inverter system 1 can be prevented. In addition, since the carrier frequency fc is temporally changed, concerning a frequency band other than the broadcasting frequency band fs±Δfs, spectrum components with high-level noise, which would be generated at an nth harmonic frequency of the carrier frequency fc if the carrier frequency fc is constant, can be spread over the nth-order frequency range from n·fc1 to n·fc4 in which the carrier frequency fc changes with time. Thus, compared with a case where the carrier frequency fc is constant, the level of noise can be much reduced. In addition, since the frequency range having the first noise level 24 of the adjacent frequency spectrum of the (n+1)th harmonic components of the carrier frequency fc or the frequency range having the second noise level 28 of the frequency spectrum of the (n−1)th harmonic components does not overlap the broadcasting frequency band fs±Δfs, an increase in the level of noise generated in the broadcasting frequency band fs±Δfs can be suppressed. Thus, an interference with other receivers or apparatuses can be reduced.

Accordingly, by setting "fc1", "fc2", "fc3" and "fc4" such that inequalities (1.1) and (1.2) are satisfied while changing the carrier frequency fc with time, the level of noise generated in a wide frequency range can be reduced and the level of noise generated in a predetermined frequency range, that is, the nth frequency range from n·fc2 to n·fc3, can be further reduced.

Figure 3A:
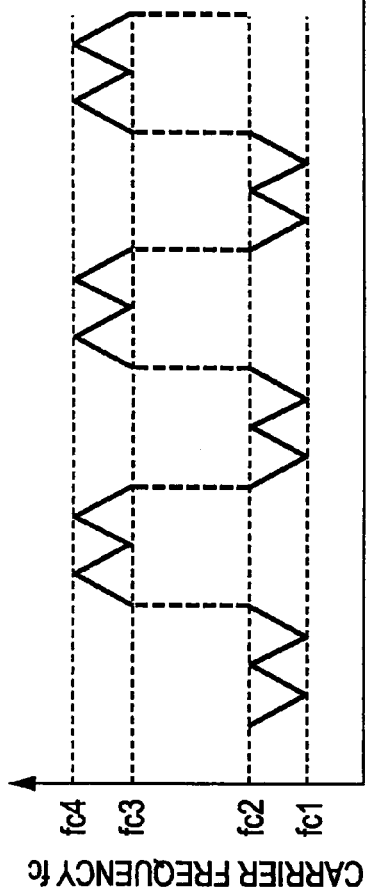
FIG. 3A shows a temporal change of a carrier frequency in a second embodiment of the invention.
Figure 3B:
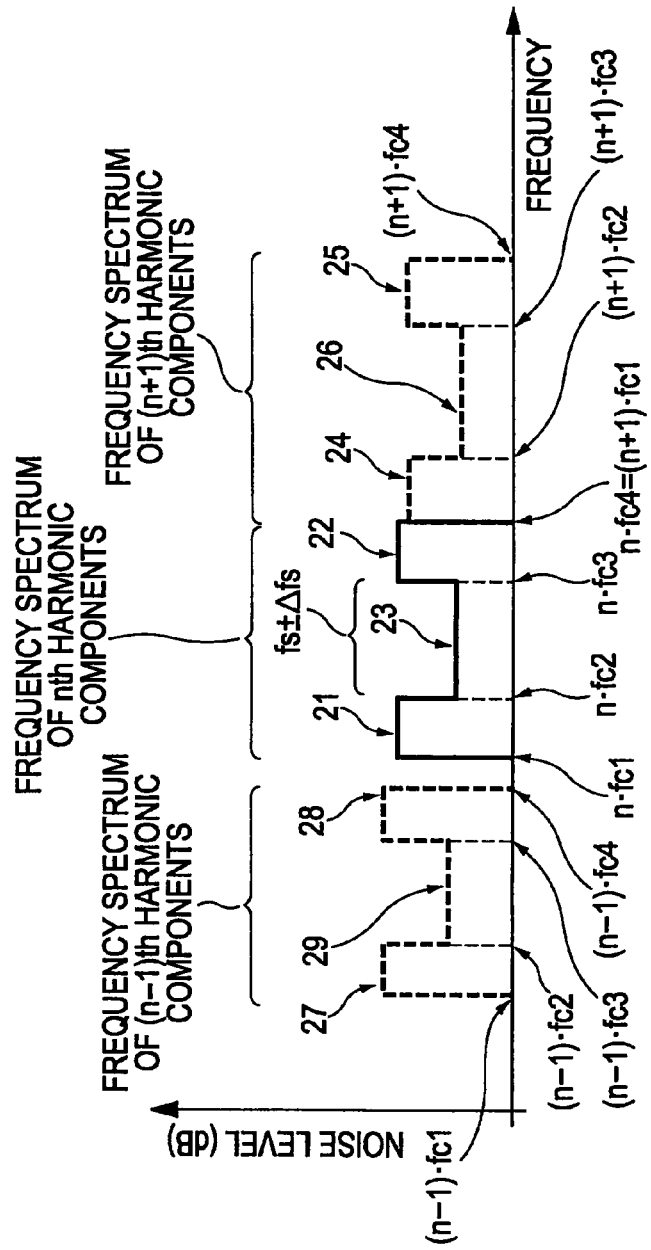
FIG. 3B shows harmonic spectra in the second embodiment.

An inverter system according to a second embodiment is described next with reference to FIGS. 3A and 3B, paying particular attention to a difference between the inverter system according to the second embodiment and the inverter system 1 according to the first embodiment. The same component parts as in the first embodiment are referred to with the same reference numerals, and the descriptions of those same parts will be omitted. FIG. 3A shows a temporal change of a carrier frequency fc in the second embodiment. FIG. 3B shows harmonic spectra in the second embodiment. The configuration of the inverter system according to the second embodiment is the same as the configuration of the inverter system 1 according to the first embodiment. In addition, the waveform of the carrier frequency fc shown in FIG. 3A is the same as the waveform of the carrier frequency fc shown in FIG. 2A. Moreover, the frequency spectra of the carrier frequency fc shown in FIG. 3B closely resemble the frequency spectra of the carrier frequency fc shown in FIG. 2B. The inverter system according to the second embodiment is different from the inverter system 1 according to the first embodiment only in how the range in which the carrier frequency fc changes is determined.

More specifically, in the second embodiment "fc1" and "fc4" are determined such that approximate expression (2) is satisfied:

$$n \cdot fc4 \approx (n+1) \cdot fc1. \tag{2}$$

When "fc1" and "fc4" are determined as described above, the frequency spectrum of the nth harmonic components and the frequency spectrum of the (n+1)th harmonic components that are almost next to each other, that is, that are most close to each other but less likely to overlap each other, are formed. If approximate expression (2) is satisfied, the frequency spectrum of the nth harmonic components is less likely to overlap the frequency spectrum of the (n−1)th harmonic components. This has advantages in the following two points.

First, in the frequency spectrum of the nth harmonic components, the first noise level 24 of the frequency spectrum of the (n+1)th harmonic components and the second noise level 28 of the frequency spectrum of the (n−1)th harmonic components do not overlap the frequency range having the third noise level 23, that is, the nth-order frequency range from n·fc2 to n·fc3. Thus, in the nth-order frequency range from n·fc2 to n·fc3, an increase in the level of noise can be suppressed. Second, in terms of increasing a frequency range of a frequency spectrum of harmonic components of each order and reducing the level of noise by temporally changing the carrier frequency fc, it is effective to further increase the frequency range of the frequency spectrum of the harmonic components. Thus, when "fc1" and "fc4" are determined such that approximate expression (2) is satisfied, a frequency range not included in a spectrum, that is, a frequency range located between frequency spectrums of harmonic components that are adjacent to each other, can be reduced as much as possible while suppressing overlapping of a frequency spectrum of harmonic components whose order is less than n. Accordingly, a frequency range can be effectively used, and a reduction of the level of noise can be achieved in a wider frequency range.

In addition, as in the first embodiment, concerning the temporal change of the carrier frequency fc, the carrier frequency fc is shifted from the frequency fc2 to the frequency fc3 substantially vertically. Thus, EMI noise generated in a predetermined frequency range, that is, the nth-order frequency range from n·fc2 to n·fc3, can be further reduced.

As described above, since "fc1", "fc2", "fc3" and "fc4" are determined such that approximate expression (2) is satisfied while the carrier frequency fc is changed with time, the level of noise generated in a wide frequency range can be reduced. Also, the level of noise generated in a predetermined frequency range, that is, the nth frequency range from n·fc2 to n·fc3, can be further reduced.

Figure 4:
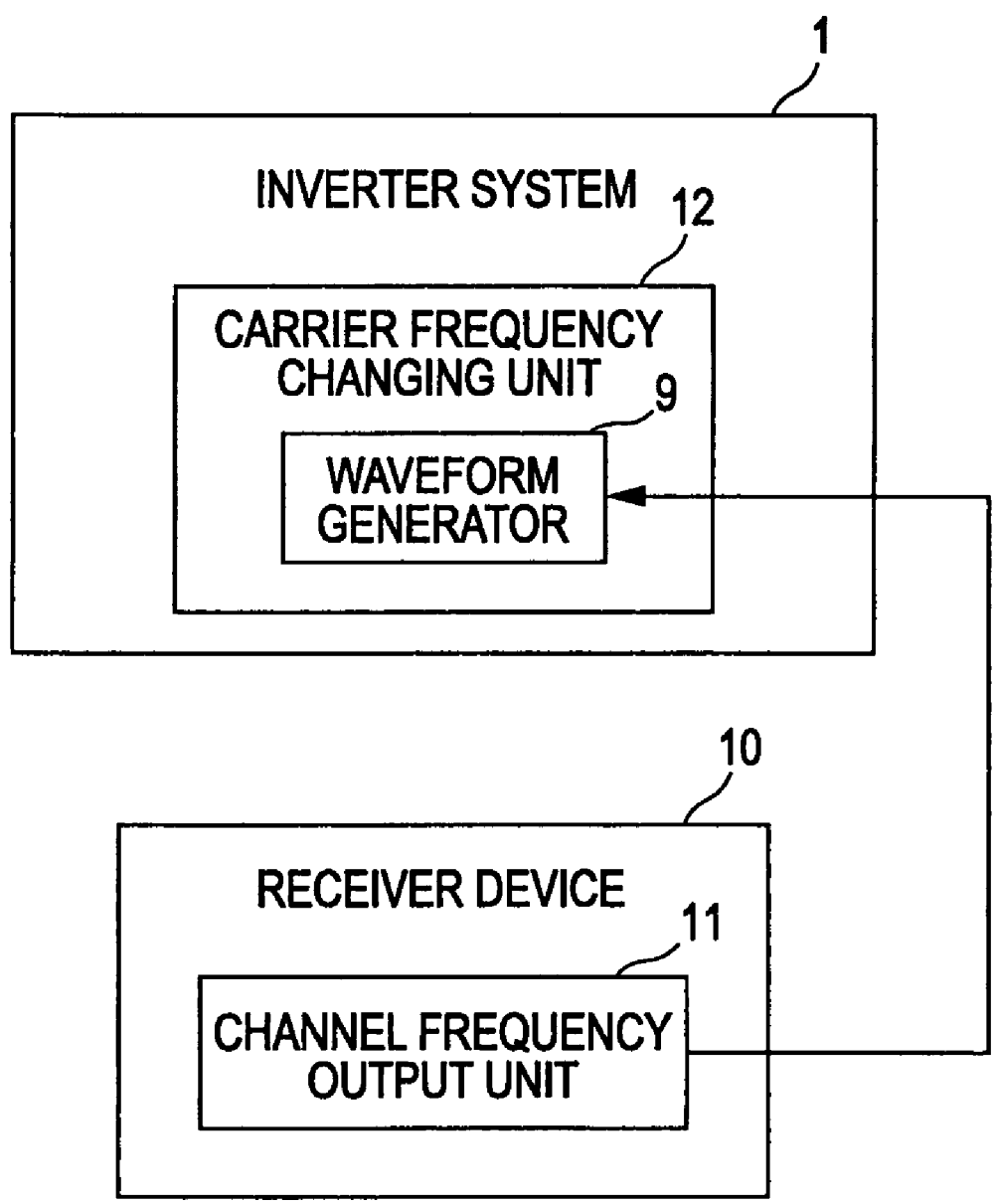
FIG. 4 shows a configuration of an inverter system according to a third embodiment of the invention and a configuration of a receiver.

An inverter system according to a third embodiment is described next with reference to FIG. 4, paying particular attention to a difference between the inverter system according to the third embodiment and the inverter system 1 according to the first embodiment. The same component parts as in the first embodiment are referred to with the same reference numerals, and the descriptions of those same parts will be omitted. FIG. 4 shows a configuration of the inverter system 1 according to the third embodiment and a configuration of a receiver 10. In the third embodiment, the receiver 10 is disposed in the vicinity of the inverter system 1 according to the first embodiment. Thus, an advantage similar to that in the first embodiment can be achieved.

In the third embodiment, an amplitude modulation (AM) radio receiver is used as the receiver 10. The AM radio receiver 10 has a function to inform the waveform generator 9 of the carrier frequency changing unit 12 provided in the inverter system 1 of a channel frequency of a broadcasting station that is being received by the AM radio receiver 10. That is, the AM radio receiver 10 includes a channel frequency output unit 11. Thus, even when a broadcasting station to be received by the AM radio receiver 10 is changed, the range of a temporal change of the carrier frequency fc can be changed in accordance with the channel frequency. Thus, in a desired channel, a problem caused by EMI noise due to a carrier frequency fc generated by the inverter system 1 when the user listens to a broadcast received by the AM radio receiver 10 can be prevented.

Figure 5A:
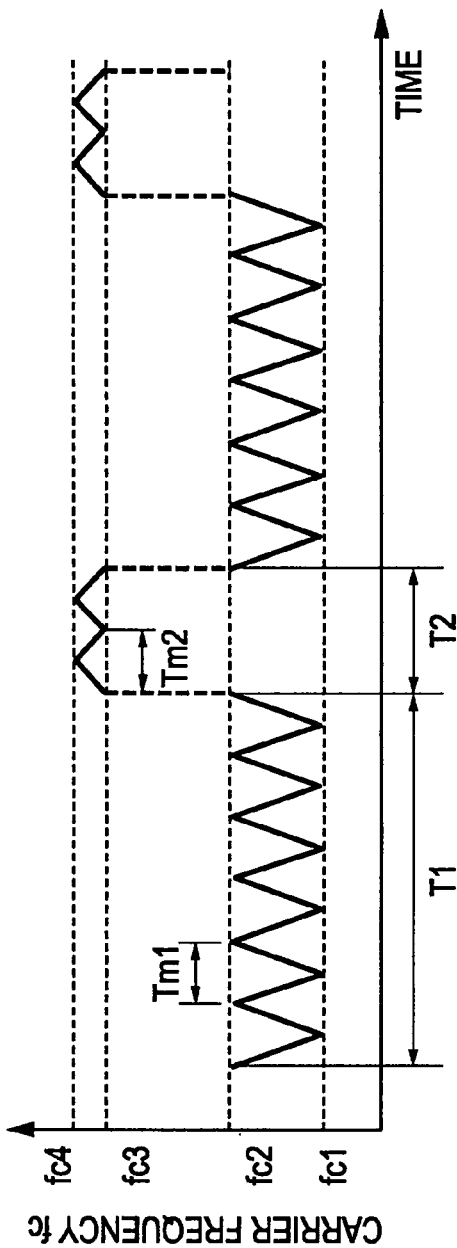
FIG. 5A shows a temporal change of a carrier frequency in a fourth embodiment of the invention.
Figure 5B:
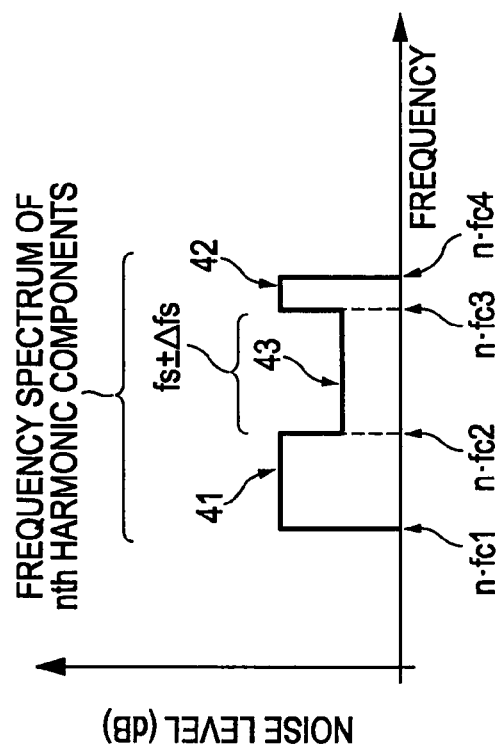
FIG. 5B shows a harmonic spectrum in the fourth embodiment.

An inverter system according to a fourth embodiment is described next with reference to FIGS. 5A and 5B, paying particular attention to a difference between the inverter system according to the fourth embodiment and the inverter system 1 according to the first embodiment. FIG. 5A shows a temporal change of a carrier frequency fc in the fourth embodiment. FIG. 5B shows a harmonic spectrum in the fourth embodiment. The configuration of the inverter system according to the fourth embodiment is the same as the configuration of the inverter system 1 according to the first embodiment. The inverter system according to the fourth embodiment is different from the inverter system 1 according to the first embodiment only in the temporal change, that is, the waveform of the carrier frequency fc, as shown in FIG. 5A.

In the fourth embodiment, as shown in FIG. 5B, in the frequency spectrum of the nth harmonic components, an nth-order frequency range from n·fc2 to n·fc3 including the broadcasting frequency band fs±Δfs is located in a higher frequency portion, not at the center of the nth-order frequency range from n·fc1 to n·fc4. As in the first embodiment, the frequency spectrum of the nth harmonic components exhibits first noise level 41, which is substantially flat, in the nth-order frequency range from n·fc1 to n·fc2 and second noise level 42, which is substantially flat, in the nth-order frequency range from n·fc3 to n·fc4. In addition, the frequency spectrum exhibits third noise level 43, which is lower than the first noise level 41 and the second noise level 42, in the nth-order frequency range from n·fc2 to n·fc3. In this case, periods T1 and T2 are determined such that equation (3) is satisfied:

$$(fc2-fc1):(fc4-fc3)=T2:T1. \quad (3)$$

In equation (3), "T1" represents a period in which the carrier frequency fc changes in the first frequency range from the frequency fc1 to the frequency fc2, and "T2" represents a period in which the carrier frequency fc changes in the second frequency range from the frequency fc3 to the frequency fc4. Referring to FIG. 5A, the carrier frequency fc changes in a triangular wave shape during the period T1 and the period T2. When triangular wave components in the period T1 have a cycle of Tm1 and triangular wave components in the period T2 have a cycle of Tm2, equation (4) is satisfied:

$$Tm1=Tm2. \quad (4).$$

In addition, in accordance with equation (3) the ratio of the number of triangular wave components in the first frequency range from the frequency fc1 to the frequency fc2 to the number of triangular wave components in the second frequency range from the frequency fc3 to the frequency fc4 is represented by T1:T2. Thus, in the frequency spectrum of the nth harmonic components, the first noise level 41 is substantially equal to the second noise level 42. Accordingly, the level of noise in a frequency spectrum of harmonic components of each order can be reduced as much as possible.

In addition, as in the first embodiment, concerning the temporal change of the carrier frequency fc, since the carrier frequency fc is shifted in the third frequency range from the frequency fc2 to the frequency fc3 substantially vertically, EMI noise generated in a predetermined frequency range, that is, the nth-order frequency range from n·fc2 to n·fc3, can be further reduced. In addition, since "fc1", "fc2", "fc3" and "fc4" are determined such that inequalities (1.1) and (1.2) are satisfied, an increase in the level of noise caused by overlapping of the first and second noise levels with the third noise level 43 in the nth-order frequency range from n·fc2 to n·fc3 of the frequency spectrum of the nth harmonic components of the carrier frequency fc can be suppressed. Thus, the level of noise generated in a wide frequency range can be reduced, and the level of noise generated in a predetermined frequency range, that is, the nth-order frequency range from n·fc2 to n·fc3, can be further reduced.

Figure 6A:
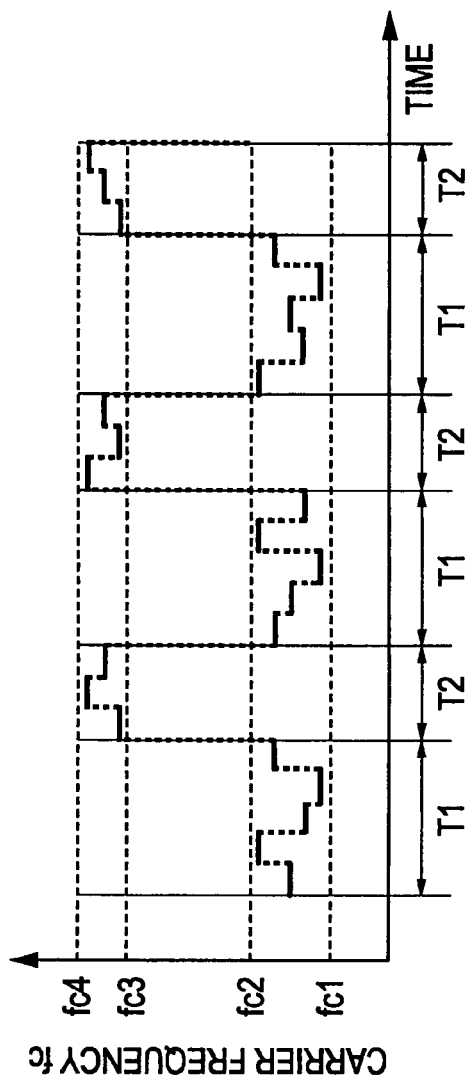
FIG. 6A shows a temporal change of a carrier frequency in a fifth embodiment of the present invention.
Figure 6B:
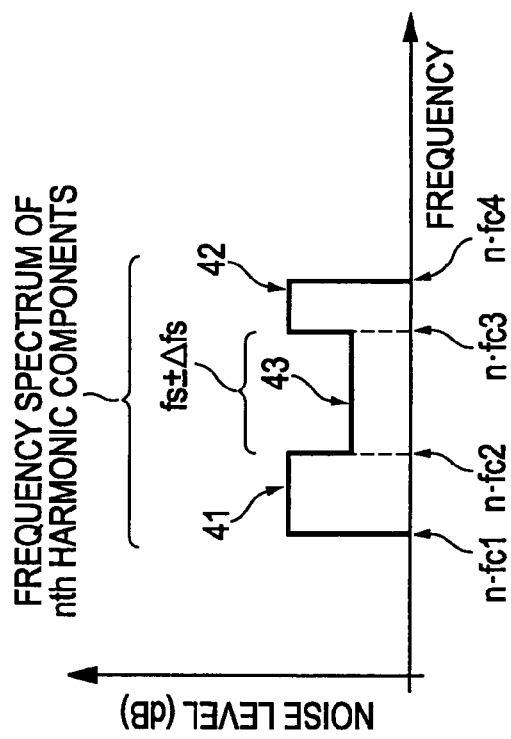
FIG. 6B shows a harmonic spectrum in the fifth embodiment.

An inverter system according to a fifth embodiment is described next with reference to FIGS. 6A and 6B, paying particular attention to a difference between the inverter system according to the fifth embodiment and the inverter system according to the fourth embodiment. FIG. 6A shows a temporal change of a carrier frequency fc in the fifth embodiment. FIG. 6B shows a harmonic spectrum in the fifth embodiment. The configuration of the inverter system according to the fifth embodiment is the same as the configuration of the inverter system according to the fourth embodiment, that is, the inverter system 1 according to the first embodiment. The inverter system according to the fifth embodiment is different from the inverter system according to the fourth embodiment only in that, as shown in FIG. 6A, the temporal change, that is, the waveform of the carrier frequency fc has a shape in which a frequency value selected at random at each predetermined interval is changed stepwise, instead of a triangular wave shape.

In this case, the carrier frequency fc is determined so as to form uniform distribution in a unit time (T1+T2) in the first frequency range from the frequency fc1 to the frequency fc2 and the second frequency range from the frequency fc3 to the frequency fc4. For example, in FIG. 6A, the ratio of the bandwidth of the first frequency range from the frequency fc1 to the frequency fc2 to the bandwidth of the second frequency range from the frequency fc3 to the frequency fc4 is represented by 5:3. In the first frequency range from the frequency fc1 to the frequency fc2, five frequency values are provided in accordance with the above-mentioned frequency bandwidth ratio. One of the five frequency values is selected as the carrier frequency fc at random at each predetermined interval, and the carrier frequency fc is shifted stepwise to the selected frequency value. In this case, a frequency value that has already been selected is not selected again.

Similarly, in the second frequency range from the frequency fc3 to the frequency fc4, three frequency values are provided as the carrier frequency fc in accordance with the above-mentioned frequency bandwidth ratio. One of the three frequency values is selected as the carrier frequency fc at random at each predetermined interval, and the carrier frequency fc is shifted stepwise to the selected frequency value. In this case, similarly, a frequency value that has already been selected is not selected again. In this case, since the ratio of T1 to T2 is represented by 5:3, uniform distribution of the carrier frequency fc is achieved. Accordingly, as in the fourth embodiment, in the frequency spectrum of the nth harmonic components, the first noise level 41 can be substantially the same as the second noise level 42. Therefore, the level of noise in a frequency spectrum of harmonic components of each order can be reduced as much as possible.

In addition, as in the fourth embodiment, concerning the temporal change of the carrier frequency fc, since the carrier frequency fc is shifted in the third frequency range from the frequency fc2 to the frequency fc3 substantially vertically, EMI noise generated in a predetermined frequency range, that is, the nth-order frequency range from n·fc2 to n·fc3, can be further reduced. In addition, since "fc1", "fc2", "fc3" and "fc4" are determined such that inequalities (1.1) and (1.2) are satisfied, an increase in the level of noise caused by overlapping of the first and second noise levels with the third noise level 43 in the nth-order frequency range from n·fc2 to n·fc3 of the frequency spectrum of the nth harmonic components of the carrier frequency fc can be suppressed. Thus, the level of noise generated in a wide frequency range can be reduced, and the level of noise generated in a predetermined frequency range, that is, the nth-order frequency range from n·fc2 to n·fc3, can be further reduced.

Each of the embodiments is merely an example. The invention is not limited to any of the embodiments. Various changes and modifications can be made to the invention within the scope of the claims. For example, in each of the first to fifth embodiments, the invention is applied to an inverter system. However, the present invention can be applied to a controller of another type of power converter. For example, the invention is applicable to a case where a DC motor is driven using a H-bridge switch, which was described above, or a controller of any type of power converter that converts input electric power into a desired form and outputs the converted electric power by controlling a switch.

In addition, although the nth-order frequency range from n·fc2 to n·fc3 is the same as the broadcasting frequency band fs±Δfs in the foregoing embodiments, the nth-order frequency range from n·fc2 to n·fc3 may be different from the broadcasting frequency band fs±Δfs.

Further, although the inverter system 1 according to each of the first to fifth embodiments includes the PWM inverter 2, the three-phase brushless DC motor 3, the current sensors 4a, 4b and 4c, the controller 13, the battery B, and the capacitor C, the configuration of the inverter system 1 is not necessarily limited to this. Similarly, although the controller 13 includes the current command generator 5, the PID controllers 6a, 6b and 6c, the comparators 8a, 8b and 8c, and the carrier frequency changing unit 12 in each of the first to fifth embodiments, the configuration of the controller 13 is not necessarily limited to this. In addition, although the carrier frequency changing unit 12 includes the carrier signal generator 7 and the waveform generator 9 in each of the first to fifth embodiments, the configuration of the carrier frequency changing unit 12 is not necessarily limited to this. For example, the waveform generator 9 may be configured separately.

In addition, although the waveform generator 9 outputs to the carrier signal generator 7 a voltage waveform obtained by adding a waveform output from the first oscillator and a waveform output from the second oscillator in an adder in each of the foregoing embodiments, the waveform may be generated by digital calculation.

Although a carrier frequency fc used in each of the first to fourth embodiments changes in a triangular wave shape in the first frequency range from the frequency fc1 to the frequency fc2 and the second frequency range from the frequency fc3 to the frequency fc4, the carrier frequency fc does not necessarily change in the triangular wave shape. For example, a sinusoidal wave shape may be used.

In yet another variation, although the frequencies fc1 to fc4 are determined such that inequalities (1.1) and (1.2) are satisfied in each of the fourth and fifth embodiments, the frequencies fc1 to fc4 may be determined such that approximate expression (2) is satisfied.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A controller of a power converter that converts input electric power into a desired form and outputs the converted electric power by controlling a power converter switch, the controller comprising:
    a carrier signal generator operable to produce a carrier signal for controlling the power converter switch in accordance with a waveform that periodically changes within a first frequency range from a frequency fc1 to a frequency fc2, wherein the frequency fc1 is smaller than the frequency fc2, and within a second frequency range from a frequency fc3 to a frequency fc4, wherein the frequency fc3 is smaller than the frequency fc4; and
    a waveform generator operable to change a frequency of the waveform wherein the frequencies fc1 and fc4 satisfy at least one of:
        (A) an inequality $(n-1) \cdot fc4 \leq n \cdot fc2$ and an inequality $n \cdot fc3 \leq (n+1) \cdot fc1$ with respect to an integer n; and
        (B) an approximate expression $n \cdot fc4 \approx (n+1) \cdot fc1$ with respect to the integer n; and wherein the frequencies fc2 and fc3 satisfy an inequality $n \cdot fc2 \leq fs - \Delta fs$ and an inequality $fs + \Delta fs \leq n \cdot fc3$ wherein $fs \pm \Delta fs$ represents a predetermined frequency band.

2. The controller according to claim 1 wherein the waveform generator is further operable to receive a frequency of a channel to be received by a broadcast receiver device; and wherein the waveform generator is further operable to change the frequency of the waveform using the frequency of the channel as the frequency fs.

3. The controller according to claim 2 wherein the waveform generator is operable to generate the waveform by stepwisely changing a frequency value selected at random at each predetermined interval.

4. The controller according to claim 3 wherein the frequencies fc1, fc2, fc3, and fc4 are such that an equation $(fc2-fc1):(fc4-fc3)=b:a$ is satisfied, wherein b:a represents a ratio of a period of time belonging to the second frequency range to a period of time belonging to the first frequency range.

5. The controller according to claim 2 wherein the waveform generator is operable to change the waveform in a triangular wave shape in a predetermined cycle within the first frequency range and within the second frequency range.

6. The controller according to claim 5 wherein the frequencies fc1, fc2, fc3, and fc4 are such that an equation $(fc2-fc1):(fc4-fc3)=c:d$ is satisfied, wherein c:d represents a ratio of a number of triangular wave components of the waveform that shift within the first frequency range to a number of triangular wave components of the waveform that shift within the second frequency range.

7. The controller according to claim 1 wherein the waveform generator is operable to generate the waveform by stepwisely changing a frequency value selected at random at each predetermined interval.

8. The controller according to claim 7 wherein the frequencies fc1, fc2, fc3, and fc4 are such that an equation $(fc2-fc1):(fc4-fc3)=b:a$ is satisfied, wherein b:a represents a ratio of a period of time belonging to the second frequency range to a period of time belonging to the first frequency range.

9. The controller according to claim 1 wherein the waveform generator is operable to change the waveform in a triangular wave shape in a predetermined cycle within the first frequency range and within the second frequency range.

10. The controller according to claim 9 wherein the frequencies fc1, fc2, fc3, and fc4 are such that an equation $(fc2-fc1):(fc4-fc3)=c:d$ is satisfied, wherein c:d represents a ratio of a number of triangular wave components of the waveform that shift within the first frequency range to a number of triangular wave components of the waveform that shift within the second frequency range.

11. A controller of a power converter that converts input electric power into a desired form and outputs the converted electric power by controlling a power converter switch, the controller comprising:
    means for temporally changing a frequency of a control signal for controlling the power converter switch in accordance with a waveform that periodically changes within a first frequency range from a frequency fc1 to a frequency fc2, wherein the frequency fc1 is smaller than the frequency fc2, and within a second frequency range from a frequency fc3 to a frequency fc4, wherein the frequency fc3 is smaller than the frequency fc4;
    means for determining the frequencies fc1 and fc4 such that, with respect to an integer n, at least one of:
        (A) an inequality $(n-1) \cdot fc4 \leq n \cdot fc2$ and an inequality $n \cdot fc3 \leq (n+1) \cdot fc1$ are satisfied, and
        (B) an approximate expression $n \cdot fc4 \approx (n+1) \cdot fc1$ is satisfied; and
    means for determining the frequencies fc2 and fc3 that satisfy an inequality $n \cdot fc2 \leq fs - \Delta fs$ and an inequality $fs + \Delta fs \leq n \cdot fc3$ wherein $fs \pm \Delta fs$ represents a predetermined frequency band.

12. A control method for a power converter that converts input electric power into a desired form and outputs the converted electric power by controlling a power converter switch, the control method comprising:

changing a frequency of a control signal for controlling the power converter switch in accordance with a waveform that periodically changes within a first frequency range from a frequency fc1 to a frequency fc2, wherein the frequency fc1 is smaller than the frequency fc2, and within a second frequency range from a frequency fc3 to a frequency fc4, wherein the frequency fc3 is smaller than the frequency fc4; and determining the frequencies fc1 and fc4 such that at least one of:
 (A) an inequality $(n-1) \cdot fc4 \leq n \cdot fc2$ and an inequality $n \cdot fc3 \leq (n+1) \cdot fc1$ are satisfied with respect to an integer n, and
 (B) an approximate expression $n \cdot fc4 \approx (n+1) \cdot fc1$ is satisfied with respect to the integer n; and determining the frequencies fc2 and fc3 that satisfy an inequality $n \cdot fc2 \leq fs - \Delta fs$ and an inequality $fs + \Delta fs \leq n \cdot fc3$ wherein $fs \pm \Delta fs$ represents a predetermined frequency band.

13. The control method according to claim 12, further comprising:
 changing the waveform in a triangular wave shape in a predetermined cycle within each of the first frequency range and the second frequency range.

14. The control method according to claim 13 wherein the frequencies fc1, fc2, fc3 and fc4 satisfy an equation (fc2−fc1):(fc4−fc3)=c:d, wherein c:d represents a ratio of a number of triangular wave components of the waveform that shift within the first frequency range to a number of triangular wave components of the waveform that shift within the second frequency range.

15. The control method according to claim 12, further comprising:
 generating the waveform by stepwisely changing a frequency value selected at random at each predetermined interval.

16. The control method according to claim 15 wherein the frequencies fc1, fc2, fc3 and fc4 satisfy an equation (fc2−fc1):(fc4−fc3)=b:a, wherein b:a represents a ratio of a period of time belonging to the second frequency range to a period of time belonging to the first frequency range.

17. The control method according to claim 15, further comprising:
 changing the waveform in a triangular wave shape in a predetermined cycle within each of the first frequency range and the second frequency range.

18. The control method according to claim 17 wherein the frequencies fc1, fc2, fc3 and fc4 satisfy an equation (fc2−fc1):(fc4−fc3)=c:d, wherein c:d represents a ratio of a number of triangular wave components of the waveform that shift within the first frequency range to a number of triangular wave components of the waveform that shift within the second frequency range.

19. The control method according to claim 12, further comprising:
 selecting a frequency of a broadcast channel to be received by a receiver disposed in the vicinity of the power converter as the frequency fs; and
 changing fc1, fc2, fc3 and fc4 when fs changes.

20. The control method according to claim 19, further comprising:
 changing the waveform in a triangular wave shape in a predetermined cycle within each of the first frequency range and the second frequency range.

21. The control method according to claim 20 wherein the frequencies fc1, fc2, fc3 and fc4 satisfy an equation (fc2−fc1):(fc4−fc3)=c:d, wherein c:d represents a ratio of a number of triangular wave components of the waveform that shift within the first frequency range to a number of triangular wave components of the waveform that shift within the second frequency range.

22. The control method according to claim 19, further comprising:
 generating the waveform by stepwisely changing a frequency value selected at random at each predetermined interval.

23. The control method according to claim 22, further comprising:
 changing the waveform in a triangular wave shape in a predetermined cycle within each of the first frequency range and the second frequency range.

24. The control method according to claim 23 wherein the frequencies fc1, fc2, fc3 and fc4 satisfy an equation (fc2−fc1):(fc4−fc3)=c:d, wherein c:d represents a ratio of a number of triangular wave components of the waveform that shift within the first frequency range to a number of triangular wave components of the waveform that shift within the second frequency range.

25. The control method according to claim 22 wherein the frequencies fc1, fc2, fc3 and fc4 satisfy an equation (fc2−fc1):(fc4−fc3)=b:a, wherein b:a represents a ratio of a period of time belonging to the second frequency range to a period of time belonging to the first frequency range.

26. The control method according to claim 25, further comprising:
 changing the waveform in a triangular wave shape in a predetermined cycle within each of the first frequency range and the second frequency range.

27. The control method according to claim 26 wherein the frequencies fc1, fc2, fc3 and fc4 satisfy an equation (fc2−fc1):(fc4−fc3)=c:d, wherein c:d represents a ratio of a number of triangular wave components of the waveform that shift within the first frequency range to a number of triangular wave components of the waveform that shift within the second frequency range.

* * * * *